United States Patent
Wagner et al.

(10) Patent No.: US 11,967,693 B1
(45) Date of Patent: Apr. 23, 2024

(54) BATTERY PACK WITH AIRGAP SIZING FOR PREVENTING EJECTA DEBRIS CLOGGING

(71) Applicant: BETA AIR, LLC, South Burlington, VT (US)

(72) Inventors: Sam Wagner, South Burlington, VT (US); Nathan Goldsberry, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/966,798

(22) Filed: Oct. 15, 2022

(51) Int. Cl.
| | |
|---|---|
| *H01M 10/6557* | (2014.01) |
| *H01M 10/04* | (2006.01) |
| *H01M 10/625* | (2014.01) |
| *H01M 10/6551* | (2014.01) |
| *H01M 10/6564* | (2014.01) |
| *H01M 50/317* | (2021.01) |
| *H01M 10/613* | (2014.01) |

(52) U.S. Cl.
CPC ....... *H01M 10/6557* (2015.04); *H01M 10/04* (2013.01); *H01M 10/6551* (2015.04); *H01M 10/6564* (2015.04); *H01M 50/317* (2021.01); *H01M 10/613* (2015.04); *H01M 10/625* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 9,525,195 B2 | 12/2016 | Wyatt | |
| 10,658,717 B2 | 5/2020 | Obasih | |
| 2009/0246606 A1* | 10/2009 | Shimizu | H01M 10/6569 429/62 |
| 2009/0311471 A1* | 12/2009 | Tompkins | B64G 1/58 428/117 |
| 2015/0325827 A1 | 11/2015 | Dittmar et al. | |
| 2016/0020447 A1* | 1/2016 | Janarthanam | H01M 10/625 180/68.5 |

(Continued)

FOREIGN PATENT DOCUMENTS

| | | |
|---|---|---|
| DE | 102018009445 A1 | 6/2019 |
| EP | 0858116 B1 | 5/2001 |
| WO | WO/2022043262 * | 3/2022 |

OTHER PUBLICATIONS https://www.processindustryforum.com/article/what-is-the-poppet-valve-working-principle (Year: 2020).*

*Primary Examiner* — Lisa S Park

(74) *Attorney, Agent, or Firm* — Hoffman Warnick LLC

(57) ABSTRACT

An assembly and a method of manufacturing a battery pack with airgap sizing for preventing ejecta debris clogging for an electric aircraft are disclosed. The assembly includes a battery module configured to house a battery unit, wherein the battery module includes a battery cell and a cooling plate configured to stabilize battery cell temperature. The assembly includes a fire wall configured to intercept ejecta debris from the battery cell. The assembly includes an airgap configured to contain the ejecta debris between the firewall and the battery cell. The assembly includes a headspace configured to tolerate the ejecta debris on top of the battery cell, wherein the headspace includes an ejecta vent configured to vent the ejecta debris.

17 Claims, 9 Drawing Sheets

(56) References Cited

U.S. PATENT DOCUMENTS

| | | | | |
|---|---|---|---|---|
| 2017/0259937 A1* | 9/2017 | Plessner | ............ | H01M 50/3425 |
| 2018/0069277 A1* | 3/2018 | Mastrandrea | ....... | H01M 10/613 |
| 2019/0173074 A1* | 6/2019 | Ogawa | ................ | H01M 10/613 |
| 2020/0152926 A1* | 5/2020 | Wynn | ..................... | B32B 5/028 |
| 2021/0184290 A1* | 6/2021 | Sweet | ................. | H01M 10/653 |
| 2021/0288379 A1* | 9/2021 | Meredith | ............ | H01M 50/213 |
| 2021/0320371 A1 | 10/2021 | Dunn | | |
| 2021/0391627 A1 | 12/2021 | Villanueva et al. | | |
| 2022/0021074 A1* | 1/2022 | Mabrey | ............... | H01M 50/553 |

* cited by examiner

BATTERY PACK WITH AIRGAP SIZING FOR PREVENTING EJECTA DEBRIS CLOGGING

FIELD OF THE INVENTION

The present invention generally relates to the field of electrical aircraft. In particular, the present invention is directed to a battery pack with airgap sizing for preventing ejecta debris clogging.

BACKGROUND

The burgeoning of electric vertical take-off and landing (eVTOL) aircraft technologies promises an unprecedented forward leap in energy efficiency, cost savings, and the potential of future autonomous and unmanned aircraft. However, the technology of eVTOL aircraft is still lacking in crucial areas of battery solutions.

SUMMARY OF THE DISCLOSURE

In an aspect, a battery pack with airgap sizing for preventing ejecta debris clogging is presented. The battery pack includes a battery module configured to house a battery unit, wherein the battery module includes a battery cell and a cooling plate configured to stabilize battery cell temperature. The battery pack includes a fire wall configured to intercept ejecta debris from the battery cell. The battery pack includes an airgap configured to contain the ejecta debris between the firewall and the battery cell. The battery pack includes a headspace configured to tolerate the ejecta debris on top of the battery cell, wherein the headspace includes an ejecta vent configured to vent the ejecta debris.

In another aspect, a method of manufacturing a battery pack with airgap sizing for preventing ejecta debris clogging is presented. The method includes housing, by using a battery module, a battery unit, wherein the battery module includes a battery cell and a cooling plate, stabilizing battery cell temperature. The method includes intercepting, by using a firewall, ejecta debris from the battery cell. The method includes containing, by using an airgap, the ejecta debris between the firewall and the battery cell. The method includes tolerating, by using a headspace, the ejecta debris on top of the battery cell, wherein the headspace includes an ejecta vent. The method includes venting, by using the ejecta vent, the ejecta debris.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a battery pack with airgap sizing for preventing ejecta debris clogging for an electric aircraft. In an embodiment, an electric aircraft may include electric vertical takeoff and landing aircraft.

Aspects of the present disclosure can be used to house a battery unit using a battery module, wherein the battery module includes a battery cell and a cooling plate, stabilizing battery cell temperature. Aspects of the present disclosure can also be used to intercept ejecta debris from the battery cell using a firewall. This is so, at least in part, because the firewall includes ablative layer.

Aspects of the present disclosure allow for venting the ejecta debris using an ejecta vent, wherein the ejecta vent vents the ejecta debris from airgap, wherein the airgap contains the ejecta debris between the firewall and the battery cell, through headspace, wherein the headspace tolerate the ejecta debris on top of the battery cell. Exemplary embodiments illustrating aspects of the present disclosure are described below in the context of several specific examples.

Figure 1:
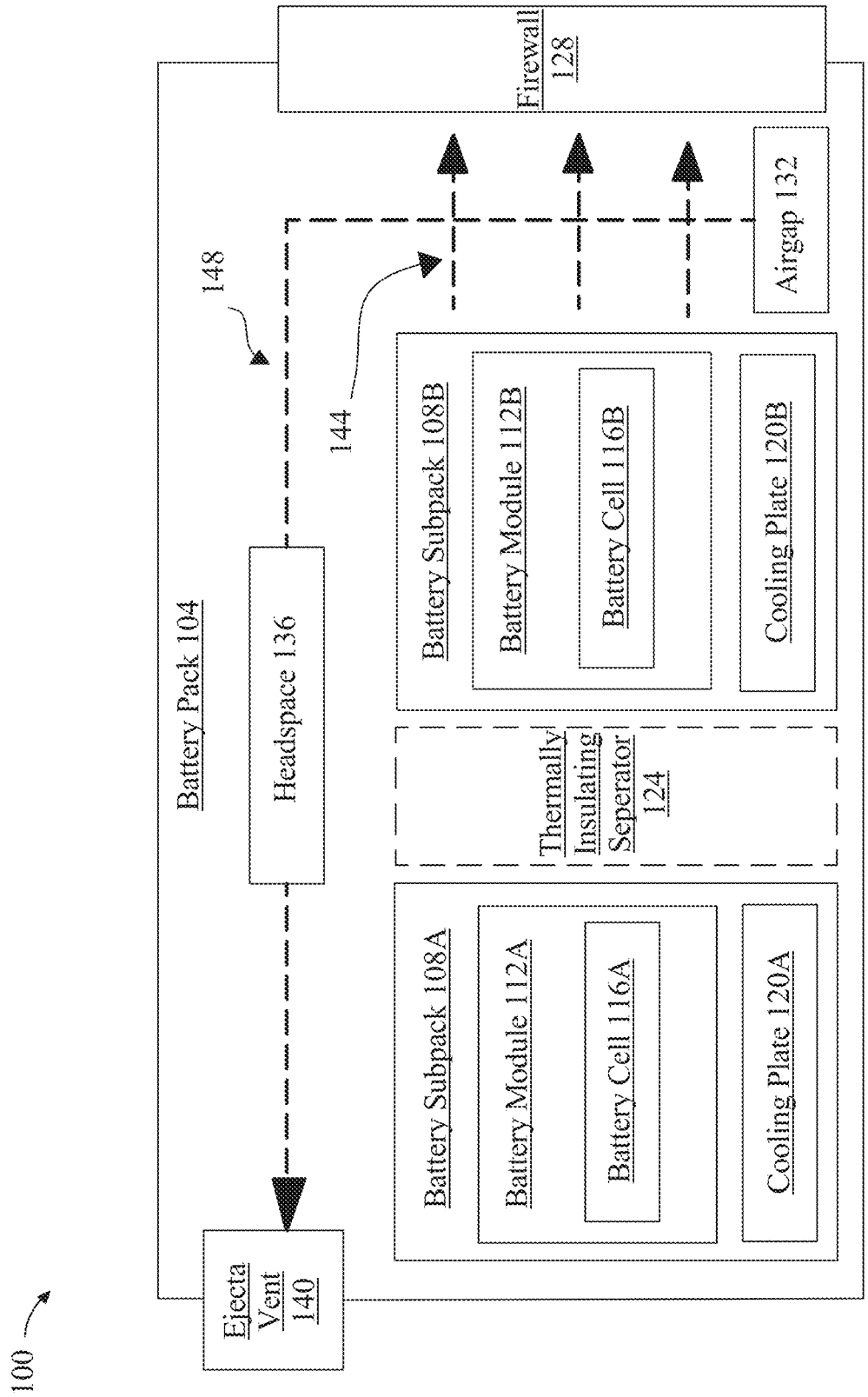
FIG. 1 is a block diagram of a battery pack with airgap sizing for preventing ejecta debris clogging.

Referring now to FIG. 1, a block diagram of a battery pack with airgap sizing for preventing ejecta debris clogging is illustrated as an assembly 100. Assembly 100 includes battery pack 104, battery subpacks 108 A-B, battery modules 112 A-B, battery cells 116 A-B, cooling plate 120 A-B, thermally insulating separator 124, firewall 128, airgap 132, headspace 136, ejecta vent 140, first ejecta flow 144, and second ejecta flow 148.

With continued reference to FIG. 1, battery pack 104 may include battery subpacks 108 A-B. "Battery pack," as used in this disclosure, is a set of battery modules. "Battery subpack," as used in this disclosure, is a subset of battery modules. Battery subpacks 108 A-B disclosed here is described in further detail in FIG. 3. Battery subpacks 108 A-B may include battery modules 112 A-B. "Battery module," as used in this disclosure, is a set of battery cells. Battery modules 112 A-B disclosed here is described in further detail in FIGS. 2A-B. Battery modules 112 A-B may include battery cells 116 A-B. A "battery cell" as described herein, is a single anode and cathode separated by electrolyte, wherein the cell produces voltage and current. Battery cells 116 A-B is described in further detail in FIGS. 2A-B. Battery modules 112 A-B may include cooling plate 120 A-B. A "cooling plate" as described herein, is a thermally conductive component separating each column of battery cells 116 A-B within a respective battery unit. Cooling plate 120 A-B disclosed here is described in further detail in FIGS. 2A-B.

With continued reference to FIG. 1, battery pack 104 may include thermally insulating separator 124. For the purpose of this disclosure, "thermally insulating separator" means an element of a battery pack configured to form a barrier between battery cells. Separator 124 is "thermally insulated" meaning it reduces the amount of heat transfer between whatever it is separating, which in this case are the battery sections. Thermally insulating separator 124 may include thermally insulating material as understood by persons skilled in battery construction. Materials that have a thermal conductivity above 50 W/m·K may be used; such materials may include steel, iron, aluminum, brass, gold, silver, or the like. Thermally insulating separator 124 may separate battery subpack 108 A from battery subpack 108 B. In some embodiments, thermally insulating separator 124 may be defined by the negative space between the battery cells that each separates.

With continued reference to FIG. 1, battery pack 104 may include firewall 128. "Firewall," as used in this disclosure, is a material or structure that is configured to substantially block, or otherwise prevent passage of ejecta debris. As used in this disclosure, "ejecta debris" is any material that has been ejected, for example from a battery cell 116 A-B. In some cases, ejecta may be ejected during thermal runaway of a battery cell. Alternatively or additionally, in some cases, ejecta debris may be ejected without thermal runaway of a battery cell. As used in this disclosure, a "thermal runaway" is a phenomenon in which battery cells 116 A-B enters an uncontrollable, self-heating state. Thermal runaway may occur when battery cells 116 A-B develop lower resistances or lower triggering voltages as the internal temperature increases. As current flow gets markedly increased, increased power dissipation may raise the temperature further. A positive feedback effect of thermal runaway may cause failure, such as inefficient battery power usage, absence of battery power, electrical explosion, or fire. In some cases, ejecta debris may include, but is not limited to, gas, shrapnel, particulates from battery cells 116 A-B, and the like thereof. In some cases, ejecta debris may include lithium-based compounds. Alternatively or additionally, ejecta debris may include carbon-based compounds, such as without limitation carbonate esters. Ejecta debris may include matter in any phase or form, including solid, liquid, gas, vapor, and the like. In some cases, ejecta debris may undergo a phase change, for example ejecta debris may be vaporous as it is initially being ejected and then cool and condense into a solid or liquid after ejection.

With continued reference to FIG. 1, in some embodiments, firewall 128 may include titanium. In some embodiments, firewall 128 may include carbon fiber. In some cases, firewall 128 may include at least a one of a lithiophilic or a lithiophobic material or layer, configured to absorb and/or repel lithium-based compounds. In some cases, firewall 128 may include a lithiophilic metal coating, such as silver or gold. In some cases, firewall 128 may be flexible and/or rigid. In some cases, firewall 128 may include a sheet, a film, a foil, or the like. Alternatively or additionally, in some cases, firewall 128 may include rigid and/or structural elements, for instance which are solid. Rigid firewall 128 may include metals, composites and the like.

With continued reference to FIG. 1, in some embodiments, firewall 128 may include ablative layer. The ablative layer may be made out of an ablative material. For the purposes of this disclosure, "ablative material" may include material that is ablated by ejecta. As a non-limiting example, ablative material may ablate when it comes into contact with ejecta from one of the pouch battery cells. Once an ablative material has been ablated, for the purposes of this disclosure, it may be considered to be in a "spent state." When the ablative layer is in its "spent state," it may become detached from a vent conduit and move, with the battery ejecta, along vent conduit and out of a vent outlet. In an embodiment, and without limitation, ablative material may be composed of one or more ablative materials. For example, ablative material may be composed of a first ablative material and a second ablative material. As a further non-limiting example, ablative material may comprise a plurality of resins, such as but not limited to a first, second, third, and/or fourth ablative material. For example, and without limitation, ablative material may include one or more resins capable of vaporizing, chipping, and/or eroding a battery ejecta. As a non-limiting example, ablative material may include one or more endothermic materials such as, but not limited to silicone materials, fire-resistance materials, organic rubber, organic resins, phenolic resins, silica dust, and the like thereof. Furthermore, as another non-limiting example, ablative material may include polymeric materials, silicone, carbon-based materials, high-melting point materials, and inorganic polymers. As a further non-limiting example, ablative material may include an epoxy novolac resin. As a further non-limiting example, ablative material may include a fiberglass material arranged in a honeycomb matrix. As a further non-limiting example, ablative material may include an epoxy phenol formaldehyde resin. As a further non-limiting example, ablative material may include a carbon and/or carbon composite resin. As a further non-limiting example, ablative material may include a carbon-carbon composite, carbon-phenolic composite, carbon-elastomeric composite, carbon-ceramic composite, and the like thereof. As a further non-limiting example, ablative material may include a phenolic resin, wherein the phenolic resin may be filled with a mesoporous silica particle which may be synthesized from a tetraethyl orthosilicate. In an embodiment, and without limitation, ablative material may include one or more materials comprising an attribute of a low thermal conductivity, high thermal resistance, high emissivity, good thermal stability, refractoriness, and the like thereof. In an embodiment, and without limitation, ablative material may be layered such that a first layer that is exposed to battery ejecta may interact with the battery ejecta to produce ablative residue, wherein a second layer may be exposed as a function of the production of the ablative reside. In an embodiment, and without limitation, the exposure of the second layer may occur iteratively. In some embodiments, the portion of the ablative material that has entered a spent state may include carbonization, char, ash, flakes, dust, and the like. Additional disclosure related to ablative material may be found in U.S. patent application Ser. No. 17/563,331, filed on Dec. 28, 2021, and entitled "SYSTEM FOR ELECTRIC AIRCRAFT BATTERY VENTING USING A VENT CONDUIT" the entirety of which is incorporated by reference herein in its entirety.

With continued reference to FIG. 1, in some embodiments, firewall 128 may intercept ejecta debris from battery cells 116 A-B. In some embodiments, firewall 128 may direct the ejecta debris into the airgap 132. The flow of the ejecta debris from battery cells 116 A-B to firewall 128 is depicted as "first ejecta flow" 144. First ejecta flow 144 represents a hypothetical path that the ejecta debris and other fluid may take when the ejecta debris transit from battery cells 116A-B to firewall 128 and get contained in airgap 132.

As used in this disclosure, an "airgap" is a first open portion between a first side of battery cells 116 A-B and firewall 128. The first side of battery cells 116 A-B may include a circular surface of battery cells 116 A-B. Airgap 132 may be configured to tolerate ejecta debris from one or more cells and/or battery subpack during thermal runaway. In some embodiments, airgap 132 may include an airgap width, wherein the "airgap width" is a width of airgap 132. In a non-limiting example, airgap width of a battery subpack may be around 0.5 cm, 1 cm, 5 cm, or 10 cm. In some examples, airgap width may be a function of cell parameters, e.g., cell width, cell height, cell area, cell energy capacity, or the like. In another non-limiting example, increased number of battery cells 116 A-B may increase airgap width.

With continued reference to FIG. 1, the battery pack 104 may include headspace 136. As used in this disclosure, "headspace" is a second open portion of battery subpack 108 on a second side of battery cells 116 A-B. The second side of battery cells 116 A-B may include a cylindrical surface of batter cells 116 A-B. Headspace 136 may be configured to tolerate ejecta debris. In some embodiments, headspace 136 may include headspace height, wherein the "headspace height" is height of headspace in a battery pack. In an embodiment, increased number of battery cells 116 A-B may increase headspace height. Exemplary headspace widths include without limitation, around 0.5 cm, 1 cm, 2 cm, 5 cm, 10 cm, and the like. In some cases, headspace width is a function of cross-sectional area and headspace height. In some cases, headspace may be a function of battery subpack 108 parameters, e.g., number of cells in subpack, energy capacity of subpack, and the like.

With continued reference to FIG. 1, in some embodiments, headspace 136 may include ejecta vent 140. "Ejecta vent," as used in this disclosure, is a duct that exhaust ejecta debris within a battery pack. Ejecta vent 140 may be fluidically connected to headspace 136. For the purposes of this disclosure, "fluidically connected" means that fluid is able to flow from one of the fluidly connected elements to the other, notwithstanding any elements that temporarily or optionally restrict fluid flow, such as, as non-limiting examples, a check valve or a pressure disk. Ejecta vent 140 may vent ejecta debris from airgap 132 through headspace 136. The flow of the ejecta debris from airgap 132 to ejecta vent 140 is depicted as "second ejecta flow" 148. Second ejecta flow 148 represents a hypothetical path that the ejecta debris and other fluid may take when it transits from airgap 132 through headspace 136. In an embodiment, ejecta vent 140 may include a cooling fin. "Cooling fin," as used in this disclosure, is a fin that extends surface from an object to increase a rate of heat transfer. In another embodiment, ejecta vent 140 may include multiple cooling fins. The cooling fin may be covered in ablative layer. The cooling fin may be made of a material with high heat transfer properties. As a non-limiting example, the cooling fin may include aluminum. As another non-limiting example, the cooling fin may include copper. Additional disclosure related the cooling fin may be found in U.S. patent application Ser. No. 17/563,331, filed on Dec. 28, 2021, and entitled "SYSTEM FOR ELECTRIC AIRCRAFT BATTERY VENTING USING A VENT CONDUIT" the entirety of which is incorporated by reference herein in its entirety. Ejecta vent 140 may include ejecta vent outlet, wherein the ejecta vent outlet is configured to carry the ejecta debris out of electric aircraft. More details of venting system are disclosed further in FIG. 4.

With continued reference to FIG. 1, battery pack 104 may include a sensor. The sensor may include a sensor suite, for example as described with reference to FIGS. 5-6. In some cases, the sensor may be configured to sense battery pack data and transmit battery pack data to a data storage system, for example as described below in reference to FIGS. 5-6.

Figure 2A:
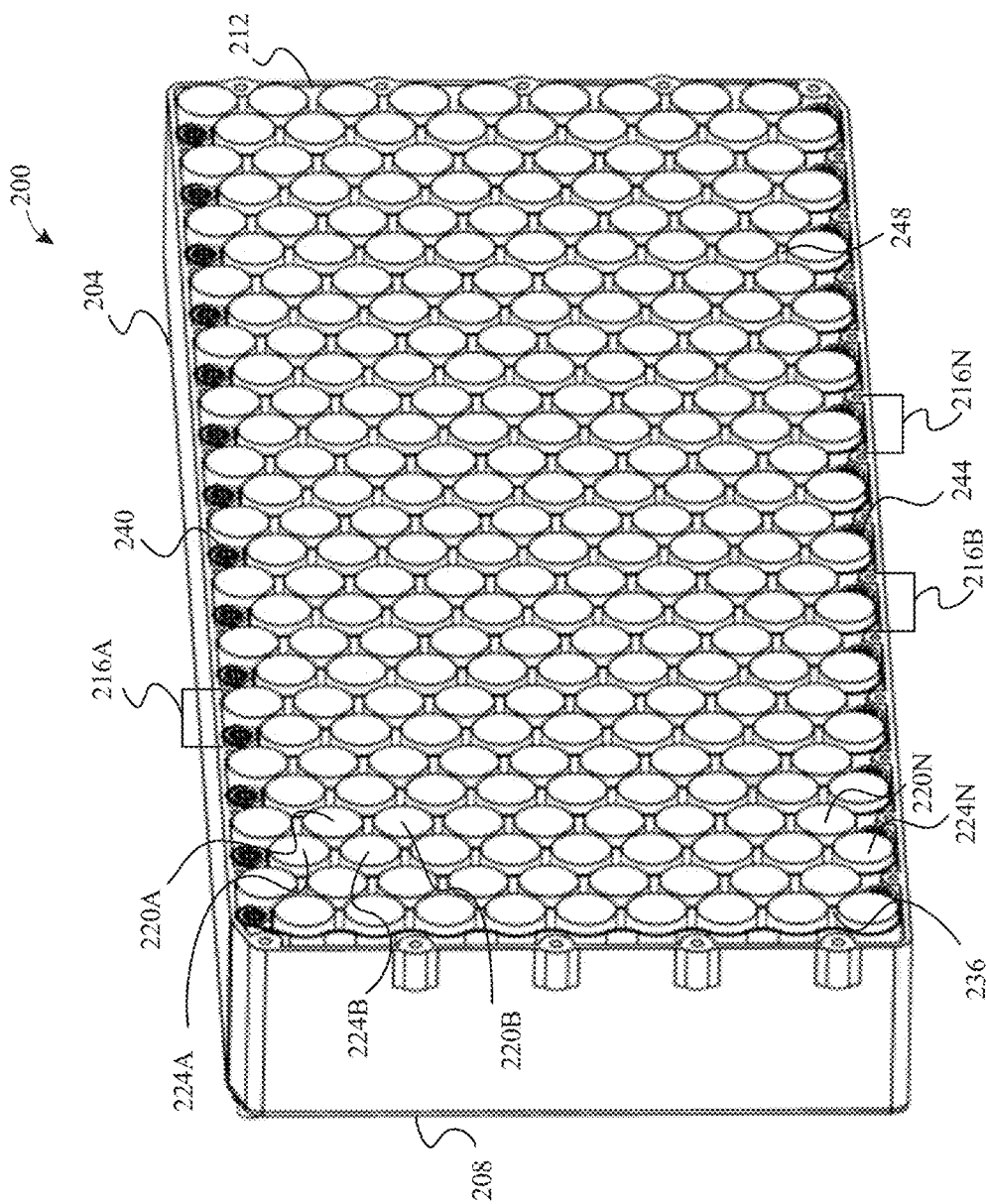
FIG. 2A-B are perspective drawings illustrating a battery module assembly comprising a cooling plate, according to embodiments.
Figure 2B:
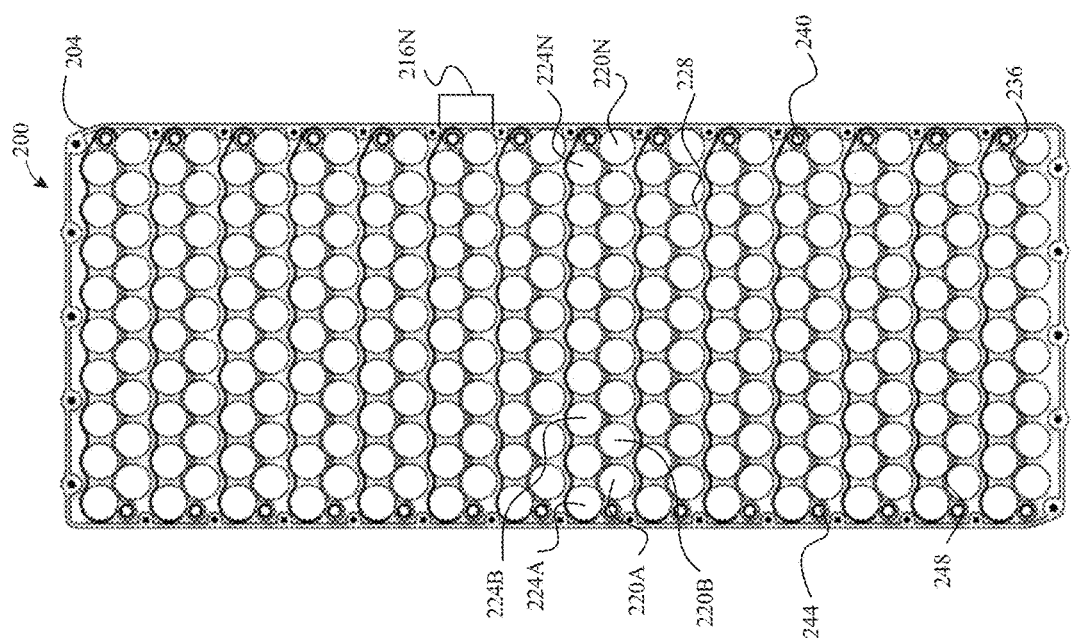

Referring now to the drawings, FIGS. 2A-B illustrate perspective views of a battery module assembly 200 with a cooling assembly disposed therein. The configuration of assembly 200 is merely exemplary and should in no way be considered limiting. Assembly 200 is configured to facilitate the flow of a gas to cool the battery module. Assembly 200 may include a battery module 204, a first side of the battery module 208, a second opposite and opposing side of the battery module 212, a battery unit 216A-N, a plurality of first battery cells 220A-N, a plurality of second battery cells 224A-N, void space 228, protective wrapping 232, cooling plate 236, cooling pipe 240, second cooling pipe 244, mounting channel 248, or any combination thereof.

With continued reference to FIGS. 2A-B, assembly 200 is designed and configured to include battery module 204. Battery module 204 is configured to include a first side 208 and a second side 212, wherein the second side 212 is opposite and opposing the first side 208. The first side 208 and the second side 212 may be include effectively parallel planes, wherein the first side 208 and the second side 212 are disposed such that they are directly opposite and oppose each other. Battery module 204 can also include one or more battery units 216A-N. Battery module 204 is configured to house and/or encase at least a portion of each battery unit 216A-N. Battery units 216A-N may be configured to be contained within the battery module 204, wherein each battery unit 216A-N is disposed between the first side 208 and the second side 212. As an exemplary embodiment, FIG. 2A-B illustrates 14 battery units 216A-N housed within battery module 204, however, a person of ordinary skill in the art would understand that any number of battery units 216A-N may be housed within battery module 204. In embodiments, each battery unit 216A-N is configured to provide power to at least a portion of an aircraft such as an eVTOL and can include one or more battery cells 220A-N. Additional disclosure related battery module may be found in U.S. patent application Ser. No. 16/948,141, filed on Sep. 4, 2020, and entitled "COOLING ASSEMBLY FOR USE IN A BATTERY MODULE ASSEMBLY" the entirety of which is incorporated by reference herein in its entirety, or in U.S. application Ser. No. 17/404,500, filed on Aug. 17, 2021, and entitled "STACK BATTERY PACK FOR ELECTRIC VERTICAL TAKE-OFF AND LANDING AIRCRAFT," or U.S. application Ser. No. 17/475,743, filed on Sep. 15, 2021, and entitled "BATTERY SYSTEM AND METHOD OF AN ELECTRIC AIRCRAFT WITH SPRING CONDUCTORS".

With continued reference to FIGS. 2A-B, according to embodiments, each battery cell 220A-N may be effectively parallel relative to one another. Battery cell 220A-N may include a pouch cell. For example and without limitation, the pouch cell may be consistent with the pouch cell in U.S. patent application Ser. No. 17/362,389, filed on Jun. 29, 2021, and entitled, "SYSTEM FOR A POUCH CELL CASING CONFIGURED FOR USE IN AN ELECTRIC AIRCRAFT," which is incorporated by reference in its entirety herein. Each battery cell 220A-N may have a shape, such as a cylinder, and may include a radius. Battery cells 228 may include a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO4), lithium cobalt oxide (LCO), lithium manganese oxide (LMO), a battery cell using lithium polymer technology, and/or metal-air batteries. Battery cells 220A-N may include lead-based batteries such as without limitation lead acid batteries and lead carbon batteries. Battery cells 220A-N may include lithium sulfur batteries, magnesium ion batteries, and/or sodium ion batteries. Battery cells 220A-N may include solid state batteries or supercapacitors or another suitable energy source. In another non-limiting embodiment, battery cell 220A-N may include an electrochemical reaction configured to produce electrical energy. For example and without limitation, the electrical energy produced by one or more battery cells 220A-N may be sufficient to power at least a portion of an electric aircraft, such as an eVTOL aircraft. Each battery cell 220A-N may comprise a primary battery or a secondary battery. Each battery cell 220A-N may include electrochemical cells, galvanic cells, electrolytic cells, fuel cells, flow cells, voltaic cells, and/or any combination thereof. The electrolyte of each battery cell 220A-N may include any material, such as a liquid electrolyte or a paste electrolyte. For example and without limitation, the electrolyte of each battery cell 220A-N may include molten salt or ammonium chloride. In the embodiment of FIGS. 2A-B, one or more battery cells 220A-N are in contact with a first side of a cooling plate. The cooling plate here will be described in further detail below. Persons skilled in the art, upon reviewing the entirety of this disclosure, will be aware of various cells that may be used as the plurality of battery cells consistently with this disclosure. Additional disclosure related battery cells may be found in U.S. patent application Ser. No. 16/948,141, filed on Sep. 4, 2020, and entitled "COOLING ASSEMBLY FOR USE IN A BATTERY MODULE ASSEMBLY" the entirety of which is incorporated by reference herein in its entirety.

With continued reference to FIGS. 2A-B, each battery unit 216A-N may include a respective cooling plate 236. In embodiments, cooling plate 236 may include a first surface and a second opposite, opposing surface with a thickness between the first and second surfaces. Further, cooling plate 236 may include a first and second opposite, opposing ends. Cooling plate 236 may include a first end and a second end, wherein the second end is opposite the first end of cooling plate 236. For example and without limitation, in the illustrated embodiment of FIGS. 2A-B, cooling plate 236 is disposed such that it separates the two columns of battery cells 220 within a battery unit 216, each column contains nine battery cells. According to embodiments, cooling plate 236 may have a height that is equal to or less than the height of one or more battery cells 220A-N. In embodiments, cooling plate 236 may be composed of any suitable material. In an embodiment, cooling plate 236 may be composed utilizing aluminum. For example and without limitation, cooling plate 236 may be composed utilizing a plurality of manufacturing processes, such as extrusion, casting, subtractive manufacturing processes, and the like. As a further non-limiting example, cooling plate 236 may be composed utilizing injection molding. Injection molding may comprise injecting a liquid material into a mold and letting the liquid material solidify, taking the shape of the mold in a hardened form, the liquid material may include liquid crystal polymer, polypropylene, polycarbonate, acrylonitrile butadiene styrene, polyethylene, nylon, polystyrene, polyether ether ketone, and the like, and/or any combination thereof. Cooling plate 236 may facilitate the flow of a gas through the plurality of battery cells 220A-N. By facilitating the flow of a gas through one or more first cooling pipes 240 and/or one or more second cooling pipes 244, cooling plate 236 may cool assembly 200. In a non-limiting example, one or more first cooling pipes 240 and/or one or more second cooling pipes 244 may facilitate the flow of a liquid, wherein the liquid may cool assembly 200, such that the heat generated by assembly 200 is stripped away. In embodiments, cooling plate 236 may be disposed in a battery unit 216 such that cooling plate 236 separates each battery cell 220 within the battery unit 216. In a non-limiting embodiment, by separating each battery cell 220 within a battery unit 216, cooling plate 236 may allow a gas to flow in between each battery cell 220 in the battery unit 216. In embodiments, the gas may include, for example, compressed air. In a further non-limiting embodiment, the gas may include, for example, forced air system utilizing air intakes and/or fans. In embodiments, cooling plate 236 may be coupled to at least a portion of a respective battery unit 216A-N. Further, in embodiments, cooling plate 236 may be configured to couple to at least a portion of battery module 204. For example, cooling plate 236 may be coupled to a first side, second side, and/or any combination thereof of battery module 204. Coupling may include a mechanical fastening, without limitation, such as nuts, bolts, other fastening devices, and/or any combination thereof. Coupling may further include welding, casting, and/or the like. Persons skilled in the art, upon reviewing the entirety of this disclosure, will be aware of various means of joining that may be used coupling consistently with this disclosure.

With continued reference to FIGS. 2A-B, cooling plate 236 may include one or more cooling pipes 240 disposed on a first end of cooling plate 236. Cooling plate 236 may further include one or more second cooling pipes 244 disposed on a second end of cooling plate 236. A "cooling pipe" as described herein is a component disposed at an end of cooling plate 236. Cooling pipe 240 and/or second cooling pipe 244 may include a hollow shape comprising one or more sides, at least two ends (e.g. a top and a bottom), and a length, wherein the hollow shape includes a void having a shape the same as or different from the shape of the cooling pipe 244 and starting at a first end of the cooling pipe 244 and terminating at an opposite, opposing second end of the shape. For example and without limitation, in the illustrative embodiment of FIGS. 2A-B, cooling pipe 240 and second cooling pipe 244 comprise a tubular shape. The void of cooling pipe 240 and second cooling pipe 244 may form the hollow opening of cooling pipe 240 and/or second cooling pipe 244. In embodiments, the tubular component runs effectively parallel to each battery cell 220. In embodiments, cooling pipe 240 may be disposed such that it forms a void originating at a first side 208 of the battery module 204 and terminating at the second, opposite, and opposing side, of the battery module 204. According to embodiments, cooling pipe 240 may be composed utilizing any suitable material. For example and without limitation, cooling pipe 240 may be composed of polypropylene, polycarbonate, acrylonitrile butadiene styrene, polyethylene, nylon, polystyrene, polyether ether ketone, and the like.

With continued reference to FIGS. 2A-B, in embodiments, cooling pipe 240 may be disposed in battery module 204 such that cooling pipe 240 may allow the travel of a gas from a first side 208 of battery module 204 to the second, opposite, and opposite side 212 of the battery module 204. For example, cooling pipe 240 may be disposed to allow the passage of gas through the hollow opening/void of cooling pipe 240. The gas may include any gas as described in the entirety of this disclosure. The hollow opening of cooling pipe 240 may be of any size and/or diameter. For example and without limitation, the hollow opening cooling pipe 240 may include a diameter that is equal to or less than the radius of each battery cell 220A-N. Cooling pipe 240 may include a length equal or less than the length of one or more battery cells 220A-N such that cooling pipe 240 may not exceed the height of batteries 220A-N. Cooling pipe 240 may be disposed at each end of a cooling plate 236, wherein cooling pipe 240 may be in contact with each battery cell 220 in a respective battery unit located at the end of each column and/or row of the battery unit 216. For example and without limitation, in the illustrative embodiment of FIGS. 2A-B, a battery unit 216 may contain two columns with nine rows of battery cells 220 and cooling pipe 240 and/or second cooling pipe 244 on each end of a cooling plate 236 that is in contact with a respective battery cell 220 at the end of each of the two columns. Persons skilled in the art, upon reviewing the entirety of this disclosure, will be aware of various components that may be used as at least a cooling pipe consistently with this disclosure. Additional disclosure related a cooling plate may be found in U.S. patent application Ser. No. 16/948,141, filed on Sep. 4, 2020, and entitled "COOLING ASSEMBLY FOR USE IN A BATTERY MODULE ASSEMBLY" the entirety of which is incorporated by reference herein in its entirety.

Figure 3:
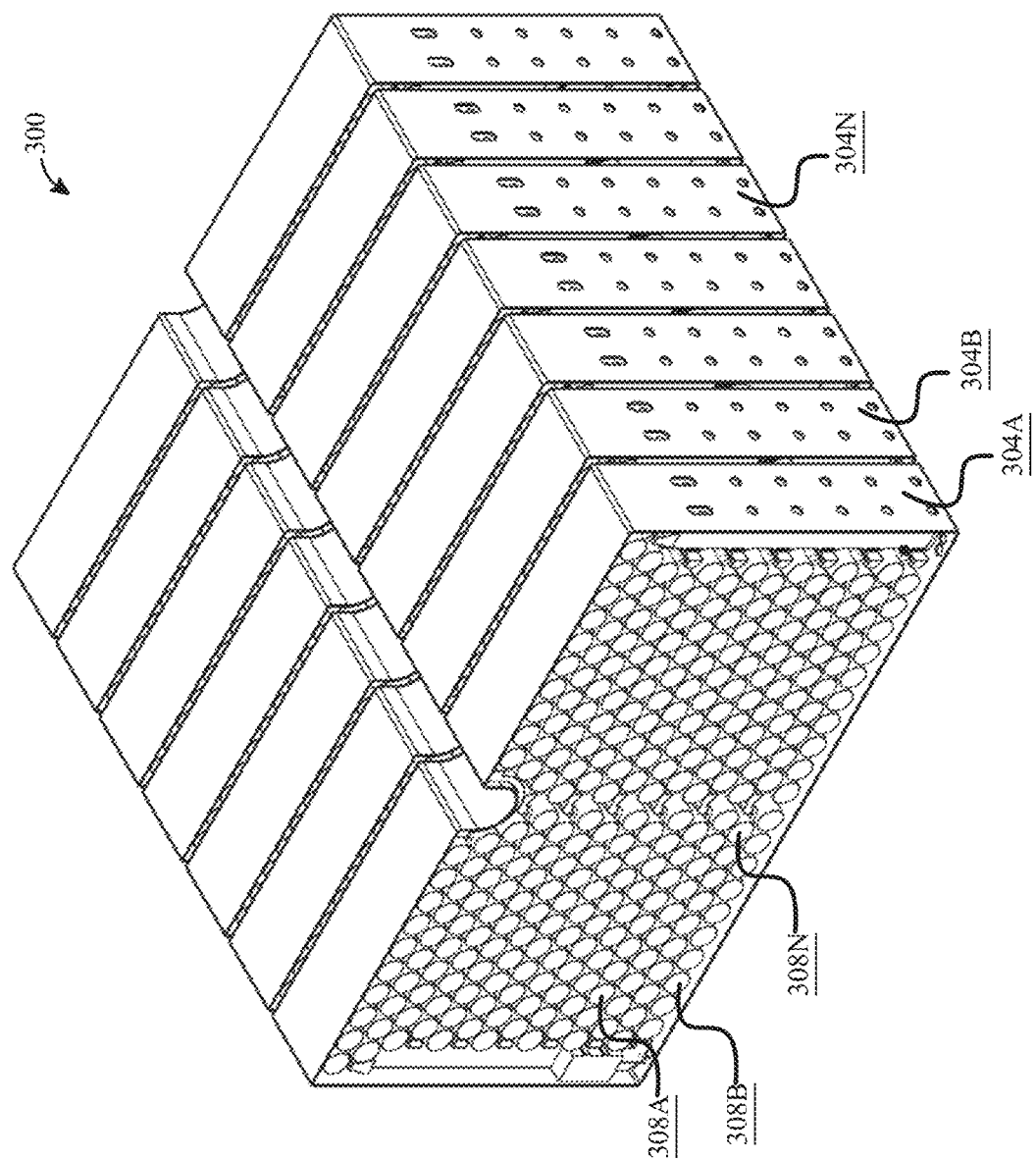
FIG. 3 is a perspective drawing illustrating a battery subpack, according to embodiments.

Referring now to FIG. 3, a perspective drawing of an embodiment of a battery subpack 300 with battery modules disposed therein. The configuration of battery subpack 300 is merely exemplary and should in no way be considered limiting. Battery subpack 300 may facilitate the flow of the media through each battery modules to cool the battery subpack. Battery subpack 300 may include one or more battery modules 304A-N. Each battery module 304A-N may include any battery module as described in further detail in the entirety of this disclosure. As an exemplary embodiment, FIG. 3 illustrates 7 battery modules 304A-N creating battery subpack 300, however, a person of ordinary skill in the art would understand that any number of battery module 304A-N may be housed within battery subpack 300. In an embodiment, each battery module 304A-N may include one or more battery cells 308A-N. Each battery module 304A-N may house and/or encase one or more battery cells 308A-N. Each battery cell 308A-N may include any battery cell as described in further detail in the entirety of this disclosure. Battery cells 308A-N may be contained within each battery module 304A-N, wherein each battery cell 308A-N is disposed in any configuration without limitation. A person of ordinary skill in the art would understand that any number of battery cells 308A-N may be housed within each battery module 304A-N of battery subpack 300. Persons skilled in the art, upon reviewing the entirety of this disclosure, will be aware of various configurations of battery modules that may be utilized for the battery subpack consistently with this disclosure.

Figure 4:
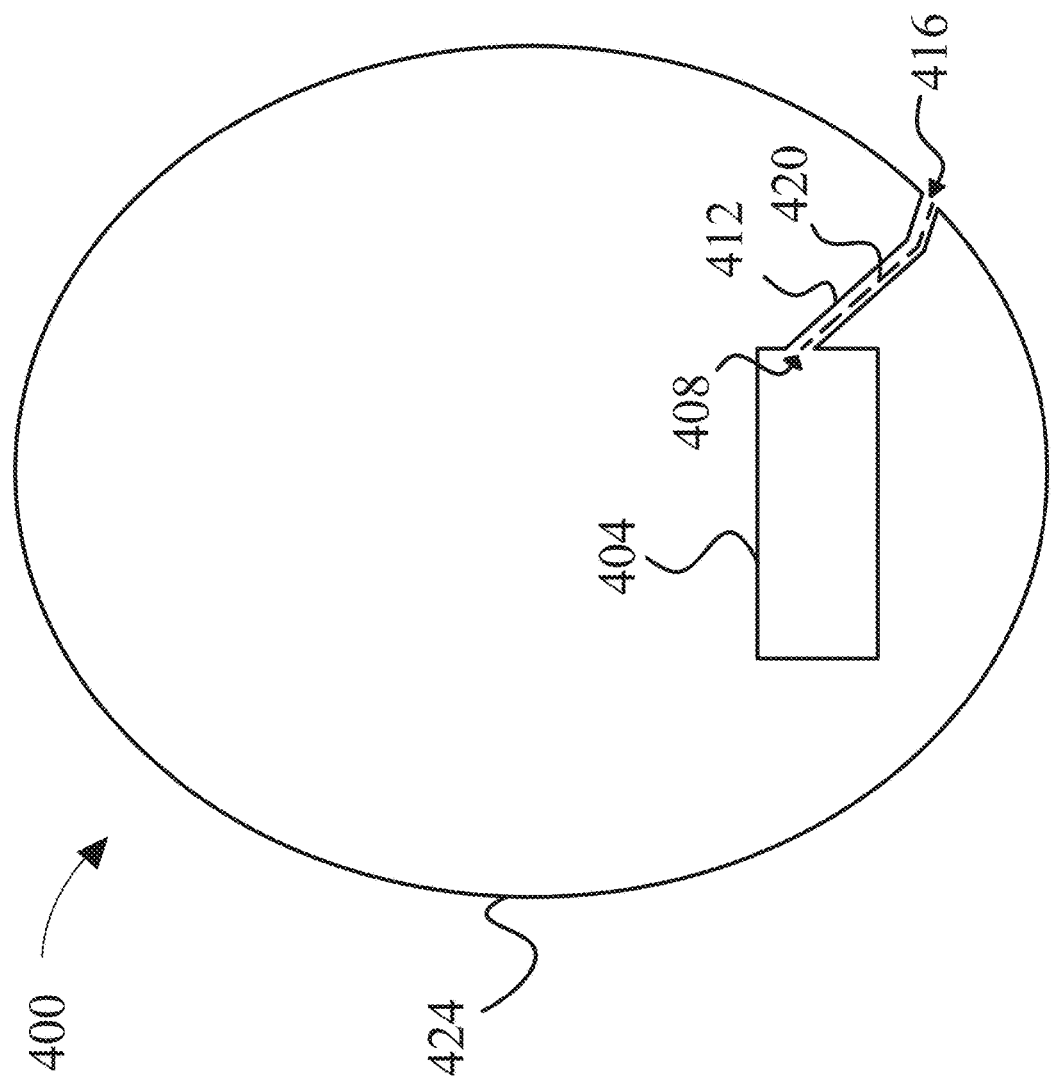
FIG. 4 is a diagram of a battery venting system disposed within an aircraft fuselage.

Referring now to the drawings, FIG. 4 illustrates an embodiment of battery venting system 400. Battery venting system 400 may include battery pack 404, ejecta vent 408, vent conduit 412, vent outlet 416, flow path 420, and fuselage 424. Battery pack 404 disclosed here is described in further detail in FIG. 2A-B. Additional disclosure related to battery venting system may be found in U.S. patent application Ser. No. 17/563,331, filed on Dec. 28, 2021, and entitled "SYSTEM FOR ELECTRIC AIRCRAFT BATTERY VENTING USING A VENT CONDUIT" the entirety of which is incorporated by reference herein in its entirety.

With continued reference to FIG. 4, battery pack 404 may include ejecta vent 408. In an embodiment, ejecta vent 408 may be configured to vent one or more cell ejecta from battery pack 404. In an embodiment, and without limitation, ejecta vent 408 may be configured to vent ablative residue from battery pack 404. In some cases, ejecta vent 408 may include a check valve. As used in this disclosure, a "check valve" is a valve that permits flow of a fluid only in certain, for example one, direction. In some cases check valve may be configured to allow flow of fluids substantially only away from battery module 112 while preventing back flow of vented fluid to battery module 112.

With continued reference to FIG. 4, check valve may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments ejecta vent 408 may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring.

With continued reference to FIG. 4, ejecta vent 408 is fluidly connected to a vent conduit 412. A "vent conduit," for the purposes of this disclosure, passage allowing ejecta and other material to exit from a device. Vent conduit 412 is also fluidly connected to a vent outlet 416. For the purposes of this disclosure, a "vent outlet" is an opening through which material carried by a vent conduit can exit a device. Vent conduit 412 may have any cross-sectional shape configured to allow battery ejecta and other fluids to move from vent port 408 to vent outlet 416. The cross section of vent conduit 412 may be circular, rectangular, trapezoidal, elliptical, triangular, irregular, square, and the like. A person of ordinary skill in the art would, after reviewing the entirety of this disclosure, appreciate that a wide variety of cross-section shapes are possible. Additional disclosure related to the cross-sectional shape of the vent conduit may be found in U.S. patent application Ser. No. 17/563,331, filed on Dec. 28, 2021, and entitled "SYSTEM FOR ELECTRIC AIRCRAFT BATTERY VENTING USING A VENT CONDUIT" the entirety of which is incorporated by reference herein in its entirety.

With continued reference to FIG. 4, vent conduit 412 may be made of a material capable of withstanding the temperatures of the aircraft and/or battery module 404. As a non-limiting example, the vent conduit 412 may be made of a material that is capable of withstanding battery ejecta that may be produced by battery module 404. In some embodiments, vent conduit 412 may be made of a polymer. As a non-limiting example, vent conduit 412 may be made of carbon fiber. As another non-limiting example, vent conduit 412 may be made of a carbon fiber composite.

With continued reference to FIG. 4, vent conduit 412 may have a flow path 420. Flow path 420 represents a hypothetical path that the battery ejecta and other fluid may take when it transits vent conduit 412. Flow path 420 may have a variety of profiles. In some embodiments, flow path 420 may be designed such that the battery ejecta and other fluid transits vent conduit 412 using the force of gravity. In some embodiments, flow path 420 may be linear and decreasing (i.e. vent port 408 is "higher" than vent outlet 416). In some embodiments, flow path 420 may have multiple different slopes. As a non-limiting example, flow path 420 may have a first section with a greater negative slope and a second section with a smaller negative slope (see, e.g., flow path 420 in FIG. 4). In some embodiments, flow path 420 may be concave. In some embodiments, flow path 420 may be convex. In some embodiments, flow path 420 may be vertical. One of ordinary skill in the art, having reviewed the entirety of this disclosure, would appreciate that a variety of flow path 420 are possible)

With continued reference to FIG. 4, vent outlet 416 is disposed on fuselage 424. Fuselage may be consistent with fuselage 704 in FIG. 7. Fuselage may be part of an electric aircraft. Vent outlet 416 is configured to allow battery ejecta, or whatever is flowing through vent conduit 412 to exit the aircraft. In some embodiments, vent outlet 416 may be contoured to steer any battery ejecta or other fluid away from the body and/or fuselage 424 of the aircraft. In some embodiments, vent outlet 416 may include fins, aerodynamic or otherwise, adapted to steer any battery ejecta or other fluid away from the body and/or fuselage 424 of the aircraft. Vent outlet 416 may be located in a variety of locations on fuselage 424. In some embodiments, vent outlet 416 may be on the bottom portion of fuselage 424. In some embodiments, vent outlet 416 may be on the side of fuselage 424. In some embodiments, vent outlet 416 may be located on the forward portion of fuselage 424. In some embodiments, vent outlet 416 may be located on the aft portion of fuselage 424.

Figure 5:
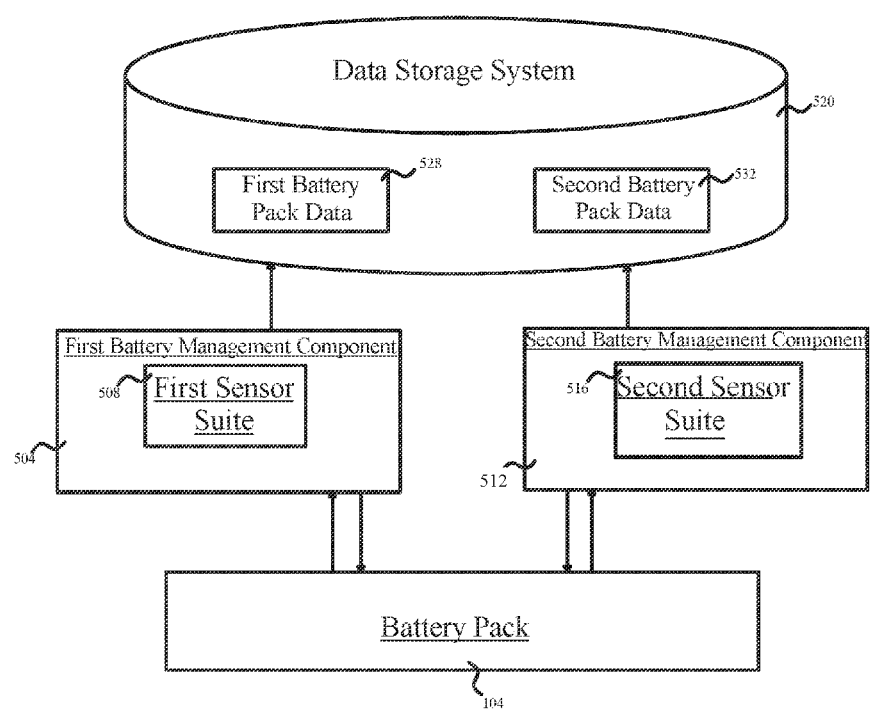
FIG. 5 is an exemplary embodiment of a battery management system.

Referring now to FIG. 5, an embodiment of battery management system 500 is presented. Battery management system 500 is integrated in a battery pack configured for use in an electric aircraft. The battery management system 500 is integrated in a portion of the battery pack or subassembly thereof. Battery management system 500 includes first battery management component 504 disposed on a first end of the battery pack. One of ordinary skill in the art will appreciate that there are various areas in and on a battery pack and/or subassemblies thereof that may include first battery management component 504. First battery management component 504 may take any suitable form. In a non-limiting embodiment, first battery management component 504 may include a circuit board, such as a printed circuit board and/or integrated circuit board, a subassembly mechanically coupled to at least a portion of the battery pack, standalone components communicatively coupled together, or another undisclosed arrangement of components; for instance, and without limitation, a number of components of first battery management component 504 may be soldered or otherwise electrically connected to a circuit board. First battery management component may be disposed directly over, adjacent to, facing, and/or near a battery module and specifically at least a portion of a battery cell. First battery management component 504 includes first sensor suite 508. First sensor suite 508 is configured to measure, detect, sense, and transmit first plurality of battery pack data 528 to data storage system 520. The battery management system used herein may be consistent with a data management system found in U.S. patent application Ser. No. 17/348,960, filed on Jun. 16, 2021, and entitled "BATTERY PACK FOR ELECTRIC VERTICAL TAKE-OFF AND LANDING AIRCRAFT", the entirety of which is incorporated by reference herein in its entirety.

With continued reference to FIG. 5, battery management system 500 includes second battery management component 512. Second battery management component 512 is disposed in or on a second end of battery pack 104. Second battery management component 512 includes second sensor suite 516. Second sensor suite 516 may be consistent with the description of any sensor suite disclosed herein. Second sensor suite 516 is configured to measure second plurality of battery pack data 532. Second plurality of battery pack data 532 may be consistent with the description of any battery pack data disclosed herein. Second plurality of battery pack data 532 may additionally or alternatively include data not measured or recorded in another section of battery management system 500. Second plurality of battery pack data 532 may be communicated to additional or alternate systems to which it is communicatively coupled. Second sensor suite 516 includes a moisture sensor consistent with any moisture sensor disclosed herein, namely moisture sensor 504. Battery pack 104 may be consistent with battery pack 104 described in FIG. 1.

With continued reference to FIG. 5, first battery management component 504 disposed in or on battery pack 104 may be physically isolated from second battery management component 512 also disposed on or in battery pack 104. "Physical isolation", for the purposes of this disclosure, refer to a first system's components, communicative coupling, and any other constituent parts, whether software or hardware, are separated from a second system's components, communicative coupling, and any other constituent parts, whether software or hardware, respectively. First battery management component 504 and second battery management component 512 may perform the same or different functions in battery management system 500. In a non-limiting embodiment, the first and second battery management components perform the same, and therefore redundant functions. If, for example, first battery management component 504 malfunctions, in whole or in part, second battery management component 512 may still be operating properly and therefore battery management system 500 may still operate and function properly for electric aircraft in which it is installed.

Additionally or alternatively, second battery management component 512 may power on while first battery management component 504 is malfunctioning. One of ordinary skill in the art would understand that the terms "first" and "second" do not refer to either "battery management components" as primary or secondary. In non-limiting embodiments, first battery management component 504 and second battery management component 512 may be powered on and operate through the same ground operations of an electric aircraft and through the same flight envelope of an electric aircraft. This does not preclude one battery management component, first battery management component 504, from taking over for second battery management component 512 if it were to malfunction. In non-limiting embodiments, the first and second battery management components, due to their physical isolation, may be configured to withstand malfunctions or failures in the other system and survive and operate. Provisions may be made to shield first battery management component 504 from second battery management component 512 other than physical location such as structures and circuit fuses. In non-limiting embodiments, first battery management component 504, second battery management component 512, or subcomponents thereof may be disposed on an internal component or set of components within battery pack 104, such as on battery module sense board.

With continued reference to FIG. 5, first battery management component 504 may be electrically isolated from second battery management component 512. "Electrical isolation", for the purposes of this disclosure, refer to a first system's separation of components carrying electrical signals or electrical energy from a second system's components. First battery management component 504 may suffer an electrical catastrophe, rendering it inoperable, and due to electrical isolation, second battery management component 512 may still continue to operate and function normally, managing the battery pack of an electric aircraft. Shielding such as structural components, material selection, a combination thereof, or another undisclosed method of electrical isolation and insulation may be used, in non-limiting embodiments. For example, a rubber or other electrically insulating material component may be disposed between the electrical components of the first and second battery management components preventing electrical energy to be conducted through it, isolating the first and second battery management components from each other.

With continued reference to FIG. 5, battery management system 500 includes data storage system 520. Data storage system 520 is configured to store first plurality of battery pack data 528 and second plurality of battery pack data 532. Data storage system 520 may include a database. Data storage system 520 may include a solid-state memory or tape hard drive. Data storage system 520 may be communicatively coupled to first battery management component 504 and second battery management component 512 and may be configured to receive electrical signals related to physical or electrical phenomenon measured and store those electrical signals as first battery pack data 528 and second battery pack data 532, respectively. Alternatively, data storage system 520 may include more than one discrete data storage systems that are physically and electrically isolated from each other. In this non-limiting embodiment, each of first battery management component 504 and second battery management component 512 may store first battery pack data 528 and second battery pack data 532 separately. One of ordinary skill in the art would understand the virtually limitless arrangements of data stores with which battery management system 500 could employ to store the first and second plurality of battery pack data.

With continued reference to FIG. 5, data storage system 520 stores first plurality of battery pack data 528 and second plurality of battery pack data 532. First plurality of battery pack data 528 and second plurality of battery pack data 532 may include total flight hours that battery pack 104 and/or electric aircraft have been operating. The first and second plurality of battery pack data may include total energy flowed through battery pack 104. Data storage system 520 may be communicatively coupled to sensors that detect, measure and store energy in a plurality of measurements which may include current, voltage, resistance, impedance, coulombs, watts, temperature, or a combination thereof. Additionally or alternatively, data storage system 520 may be communicatively coupled to a sensor suite consistent with this disclosure to measure physical and/or electrical characteristics. Data storage system 520 may be configured to store first battery pack data 528 and second battery pack data 532 wherein at least a portion of the data includes battery pack maintenance history. Battery pack maintenance history may include mechanical failures and technician resolutions thereof, electrical failures and technician resolutions thereof. Additionally, battery pack maintenance history may include component failures such that the overall system still functions. Data storage system 520 may store the first and second battery pack data that includes an upper voltage threshold and lower voltage threshold consistent with this disclosure. First battery pack data 528 and second battery pack data 532 may include a moisture level threshold. The moisture level threshold may include an absolute, relative, and/or specific moisture level threshold. Battery management system 500 may be designed to the Federal Aviation Administration (FAA)'s Design Assurance Level A (DAL-A), using redundant DAL-B subsystems.

Figure 6:
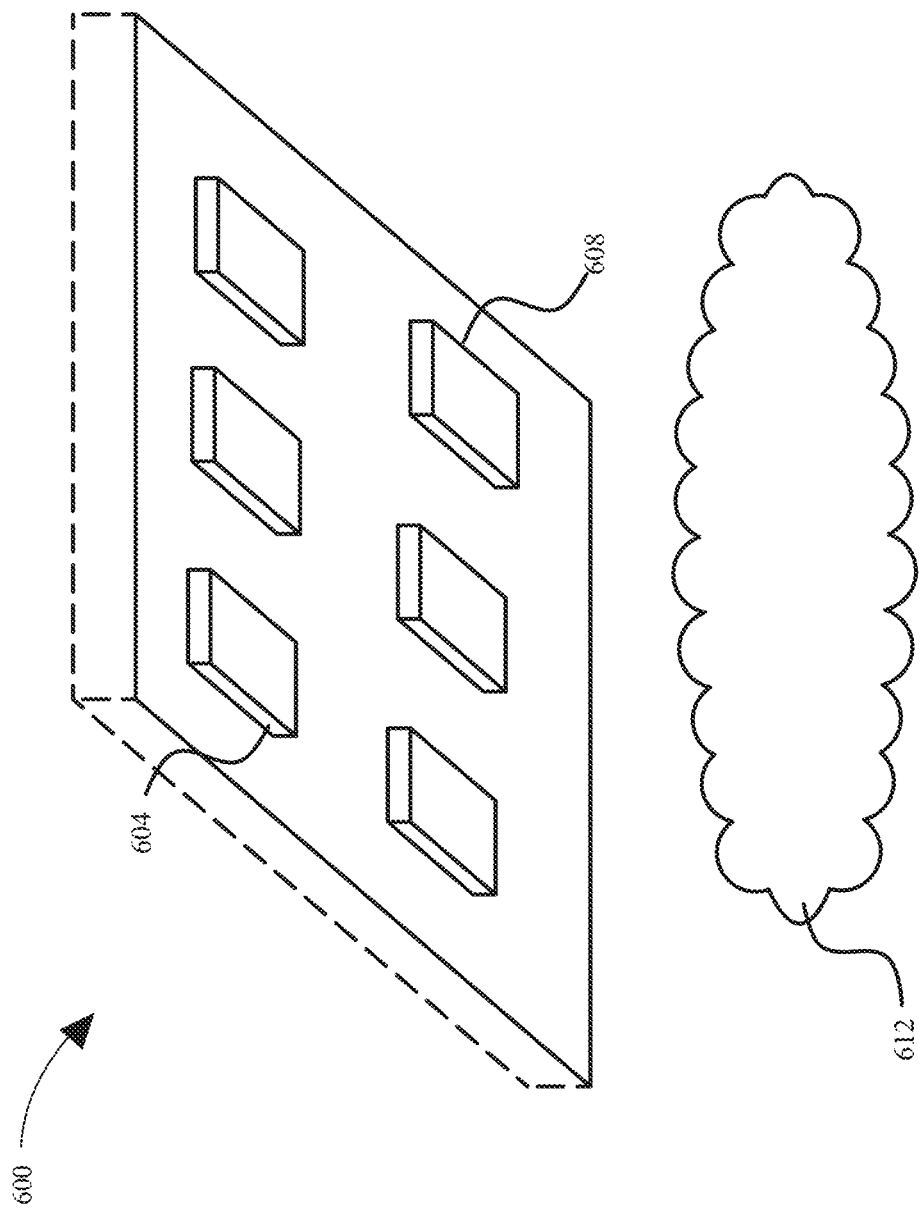
FIG. 6 is an exemplary embodiment of a sensor suite.

Referring now to FIG. 6, an embodiment of sensor suite 600 is presented. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack 104 measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of battery management system 500 and/or user to detect phenomenon is maintained and in a non-limiting example, a user alter aircraft usage pursuant to sensor readings.

With continued reference to FIG. 6, sensor suite 600 may be suitable for use as sensor suite 504 and/or second sensor suite 516 as disclosed with reference to FIG. 5 hereinabove. Sensor suite 600 includes a moisture sensor 604. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 604 may be psychrometer. Moisture sensor 604 may be a hygrometer. Moisture sensor 604 may be configured to act as or include a humidistat. A "humidistat", for the purposes of this disclosure, is a humidity-triggered switch, often used to control another electronic device. Moisture sensor 604 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 6, sensor suite 600 may include electrical sensors 608. Electrical sensors 608 may be configured to measure voltage across a component, electrical current through a component, and resistance of a component. Electrical sensors 608 may include separate sensors to measure each of the previously disclosed electrical characteristics such as voltmeter, ammeter, and ohmmeter, respectively.

Alternatively or additionally, and with continued reference to FIG. 6, sensor suite 600 include a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. Sensor suite 600 and/or a control circuit incorporated therein and/or communicatively connected thereto may be configured to adjust charge to one or more battery cells as a function of a charge level and/or a detected parameter. For instance, and without limitation, sensor suite 600 may be configured to determine that a charge level of a battery cell is high based on a detected voltage level of that battery cell or portion of the battery pack. Sensor suite 600 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 600 may include digital sensors, analog sensors, or a combination thereof. Sensor suite 600 may include digital-to-analog converters (DAC), analog-to-digital converters (ADC, A/D, A-to-D), a combination thereof, or other signal conditioning components used in transmission of a first plurality of battery pack data 528 to a destination over wireless or wired connection.

With continued reference to FIG. 6, sensor suite 600 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 600, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 6, sensor suite 600 may include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of cell failure 612 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 600, may be configured to detect combustible, flammable, toxic, oxygen depleted, a combination thereof, or another type of gas alone or in combination. The gas sensor that may be present in sensor suite 600 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 600 may include sensors that are configured to detect non-gaseous byproducts of cell failure 612 including, in non-limiting examples, liquid chemical leaks including aqueous alkaline solution, ionomer, molten phosphoric acid, liquid electrolytes with redox shuttle and ionomer, and salt water, among others. Sensor suite 600 may include sensors that are configured to detect non-gaseous byproducts of cell failure 612 including, in non-limiting examples, electrical anomalies as detected by any of the previous disclosed sensors or components.

With continued reference to FIG. 6, sensor suite 600 may be configured to detect events where voltage nears an upper voltage threshold or lower voltage threshold. The upper voltage threshold may be stored in data storage system 520 for comparison with an instant measurement taken by any combination of sensors present within sensor suite 600. The upper voltage threshold may be calculated and calibrated based on factors relating to battery cell health, maintenance history, location within battery pack, designed application, and type, among others. Sensor suite 600 may measure voltage at an instant, over a period of time, or periodically. Sensor suite 600 may be configured to operate at any of these detection modes, switch between modes, or simultaneous measure in more than one mode. First battery management component 504 may detect through sensor suite 600 events where voltage nears the lower voltage threshold. The lower voltage threshold may indicate power loss to or from an individual battery cell or portion of the battery pack. First battery management component 504 may detect through sensor suite 600 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

Figure 7:
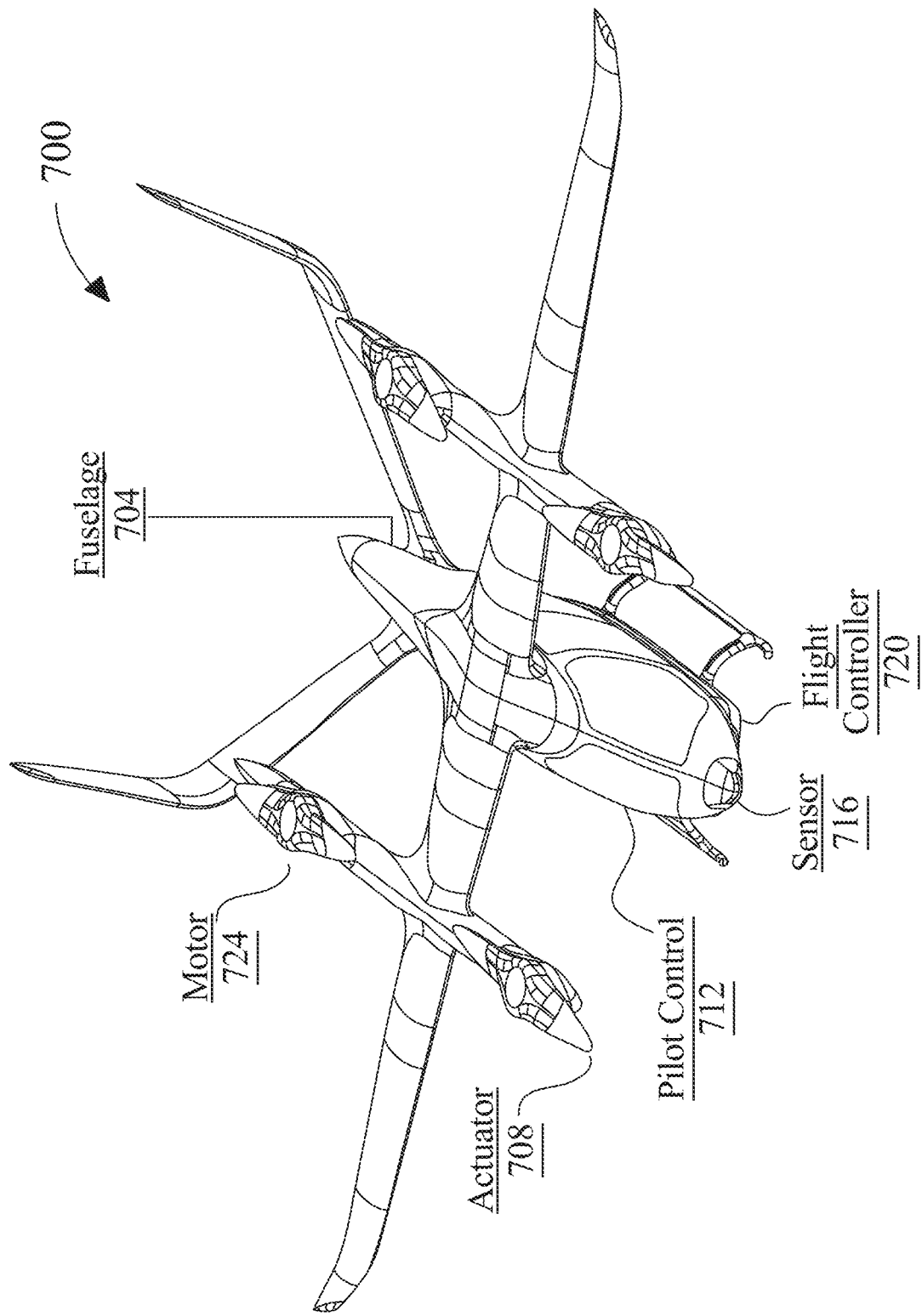
FIG. 7 is an exemplary embodiment of an electric aircraft.

Referring now to FIG. 7, an exemplary embodiment of an aircraft 700 is illustrated. As used in this disclosure an "aircraft" is vehicle that may fly. As a non-limiting example, aircraft may include airplanes, helicopters, airships, blimps, gliders, paramotors, and the like thereof. Aircraft 700 may include an electrically powered aircraft. In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight. Additional disclosure related to an aircraft may be found in U.S. patent application Ser. No. 17/348,960, filed on Jun. 16, 2021, and entitled "BATTERY PACK FOR ELECTRIC VERTICAL TAKE-OFF AND LANDING AIRCRAFT" the entirety of which is incorporated by reference herein in its entirety.

With continued reference to FIG. 7, aircraft 700 may include a fuselage 704. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 704 may comprise structural elements that physically support the shape and structure of an aircraft 700. Structural elements may take a plurality of forms, alone or in combination with other types. Structural elements may vary depending on the construction type of aircraft 700 and specifically, the fuselage. Fuselage 704 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

With continued reference to FIG. 7, aircraft 700 may include a plurality of actuators 708. In an embodiment, actuator 708 may be mechanically coupled to an aircraft 700. As used herein, a person of ordinary skill in the art would understand "mechanically coupled" to mean that at least a portion of a device, component, or circuit is connected to at least a portion of the aircraft 700 via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 7, a plurality of actuators 708 may produce a torque. As used in this disclosure, a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 708 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 708 may include a rudder, which may include, without limitation, a segmented rudder that produces a torque about a vertical axis. Additionally or alternatively, plurality of actuators 708 may include other flight control surfaces such as propulsors, rotating flight controls, or any other structural features which can adjust movement of aircraft 700. Plurality of actuators 708 may include one or more rotors, turbines, ducted fans, paddle wheels, and/or other components configured to propel a vehicle through a fluid medium including, but not limited to air.

With continued reference to FIG. 7, plurality of actuators 708 may include at least a propulsor component. As used in this disclosure a "propulsor component" is a component and/or device used to propel a craft by exerting force on a fluid medium, which may include a gaseous medium such as air or a liquid medium such as water. In an embodiment, when a propulsor twists and pulls air behind it, it may, at the same time, push aircraft 700 forward with an amount of force and/or thrust. More air pulled behind an aircraft results in greater thrust with which aircraft 700 is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows aircraft 700 through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

With continued reference to FIG. 7, in another embodiment, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure, a "fixed angle" is an angle that is secured and/or substantially unmovable from an attachment point. For example, and without limitation, a fixed angle may be an angle of 2.2° inward and/or 17° forward. As a further non-limiting example, a fixed angle may be an angle of 3.6° outward and/or 2.7° backward. In an embodiment, propellers for aircraft 700 may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

With continued reference to FIG. 7, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 7, plurality of actuators 708 may include power sources, control links to one or more elements, fuses, and/or mechanical couplings used to drive and/or control any other flight component. Plurality of actuators 708 may include a motor that operates to move one or more flight control components and/or one or more control surfaces, to drive one or more propulsors, or the like. A motor may be driven by a motor drive, such as without limitation a direct current (DC) electric power and may include, without limitation, brushless DC electric motors, switched reluctance motors, induction motors, or any combination thereof. Alternatively or additionally, a motor drive may include an inverter. A motor drive may also include electronic speed controllers, inverters, or other components for regulating motor speed, rotation direction, and/or dynamic braking.

With continued reference to FIG. 7, plurality of actuators 708 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Energy source may include a battery pack, for example as described in reference to FIGS. 2A-B. Configuration of an energy source containing connected modules may be designed to meet an energy or power requirement and may be designed to fit within a designated footprint in an electric aircraft in which system may be incorporated.

With continued reference to FIG. 7, in an embodiment, an energy source may be used to provide a steady supply of electrical power to a load over a flight by an electric aircraft. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. Persons skilled in the art, upon reviewing the entirety of this disclosure, will be aware of various devices of components that may be used as an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

With continued reference to FIG. 7, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

With continued reference to FIG. 7, another exemplary actuator may include landing gear. Landing gear may be used for take-off and/or landing/Landing gear may be used to contact ground while aircraft 700 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

With continued reference to FIG. 7, aircraft 700 may include a pilot control 712, including without limitation, a hover control, a thrust control, an inceptor stick, a cyclic, and/or a collective control. As used in this disclosure a "collective control" is a mechanical control of an aircraft that allows a pilot to adjust and/or control the pitch angle of the plurality of actuators 708. For example and without limitation, collective control may alter and/or adjust the pitch angle of all of the main rotor blades collectively. For example, and without limitation pilot control 712 may include a yoke control. As used in this disclosure a "yoke control" is a mechanical control of an aircraft to control the pitch and/or roll. For example and without limitation, yoke control may alter and/or adjust the roll angle of aircraft 700 as a function of controlling and/or maneuvering ailerons. In an embodiment, pilot control 712 may include one or more foot-brakes, control sticks, pedals, throttle levels, and the like thereof. In another embodiment, and without limitation, pilot control 712 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 700 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 700 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

With continued reference to FIG. 7, aircraft 700 may include a loading system. A loading system may include a system configured to load an aircraft of either cargo or personnel. For instance, some exemplary loading systems may include a swing nose, which is configured to swing the nose of aircraft 700 of the way thereby allowing direct access to a cargo bay located behind the nose. A notable exemplary swing nose aircraft is Boeing 747. Additional disclosure related to loading systems can be found in U.S. patent application Ser. No. 17/177,594 entitled "SYSTEM AND METHOD FOR LOADING AND SECURING PAYLOAD IN AN AIRCRAFT" by R. Griffin et al., entirety of which in incorporated herein by reference.

With continued reference to FIG. 7, aircraft 700 may include a sensor 716. Sensor 716 may be configured to sense a characteristic of pilot control 712. Sensor may be a device, module, and/or subsystem, utilizing any hardware, software, and/or any combination thereof to sense a characteristic and/or changes thereof, in an instant environment, for instance without limitation a pilot control 712, which the sensor is proximal to or otherwise in a sensed communication with, and transmit information associated with the characteristic, for instance without limitation digitized data. Sensor 716 may be mechanically and/or communicatively coupled to aircraft 700, including, for instance, to at least a pilot control 712. Sensor 716 may be configured to sense a characteristic associated with at least a pilot control 712. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 716 may include at least a geospatial sensor. Sensor 716 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 700 for both critical and non-critical functions. Sensor may be incorporated into vehicle or aircraft or be remote.

With continued reference to FIG. 7, aircraft 700 may include at least a motor 724, which may be mounted on a structural feature of aircraft 700. Design of motor 724 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 724 may include two main holes in top and bottom of mounting area to access bearing cartridge. Further, a structural feature may include a component of electric aircraft 700. For example, and without limitation structural feature may be any portion of a vehicle incorporating motor 724, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque or shear stresses imposed by at least propulsor 708. Persons skilled in the art, upon reviewing the entirety of this disclosure, will be aware of various materials, combinations of materials, and/or constructions techniques.

With continued reference to FIG. 7, electric aircraft may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 7, a number of aerodynamic forces may act upon the aircraft 700 during flight. Forces acting on aircraft 700 during flight may include, without limitation, thrust, the forward force produced by the rotating element of the electric aircraft and acts parallel to the longitudinal axis. Another force acting upon aircraft 700 may be, without limitation, drag, which may be defined as a rearward retarding force which is caused by disruption of airflow by any protruding surface of the aircraft 700 such as, without limitation, the wing, rotor, and fuselage. Drag may oppose thrust and acts rearward parallel to the relative wind. A further force acting upon aircraft 700 may include, without limitation, weight, which may include a combined load of aircraft 700 itself, crew, baggage, and/or fuel. Weight may pull aircraft 700 downward due to the force of gravity. An additional force acting on aircraft 700 may include, without limitation, lift, which may act to oppose the downward force of weight and may be produced by the dynamic effect of air acting on the airfoil and/or downward thrust from the propulsor 708 of the aircraft 700. Lift generated by the airfoil may depend on speed of airflow, density of air, total area of an airfoil and/or segment thereof, and/or an angle of attack between air and the airfoil. For example, and without limitation, aircraft 700 are designed to be as lightweight as possible. Reducing the weight of aircraft 700 and designing to reduce the number of components is essential to optimize the weight. To save energy, it may be useful to reduce weight of components of aircraft 700, including without limitation propulsors and/or propulsion assemblies. In an embodiment, motor 724 may eliminate need for many external structural features that otherwise might be needed to join one component to another component. Motor 724 may also increase energy efficiency by enabling a lower physical propulsor profile, reducing drag and/or wind resistance. This may also increase durability by lessening the extent to which drag and/or wind resistance add to forces acting on aircraft 700 and/or propulsors. Additional disclosure related to an aircraft may be found in U.S. patent application Ser. No. 17/348,960, filed on Jun. 16, 2021, and entitled "BATTERY PACK FOR ELECTRIC VERTICAL TAKE-OFF AND LANDING AIRCRAFT" the entirety of which is incorporated by reference herein in its entirety.

Figure 8:
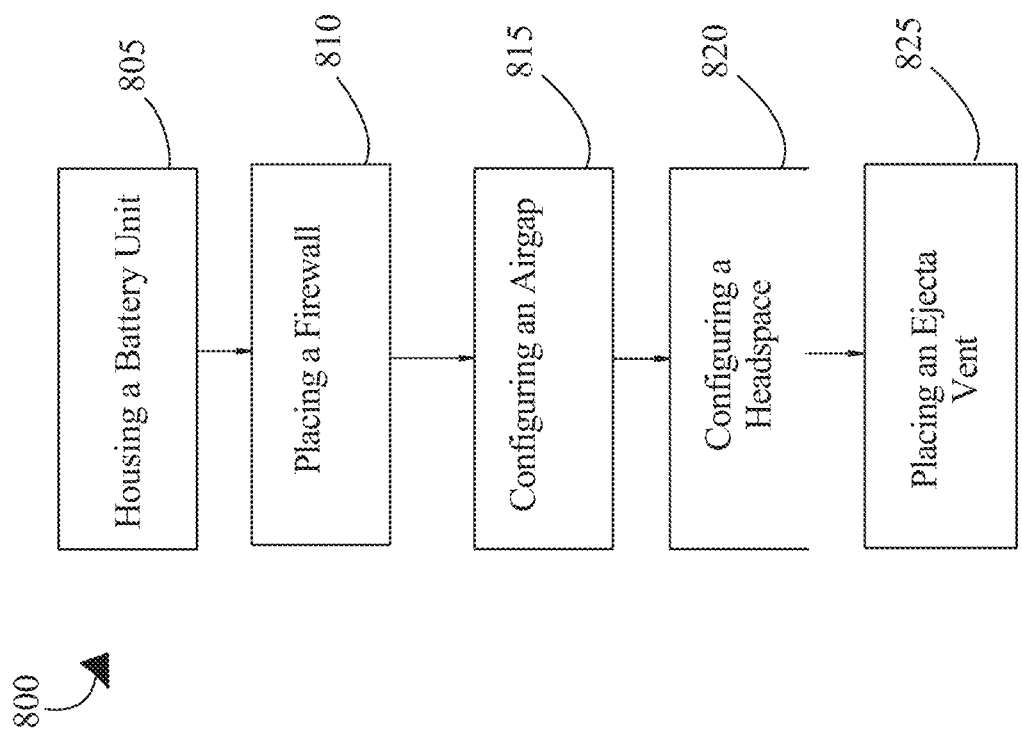
FIG. 8 is a flow diagram of an exemplary method of manufacturing a battery pack with airgap sizing for preventing ejecta debris clogging.

Referring now to FIG. 8, an exemplary embodiment of method 800 is shown. Method 800 includes a step 805 of housing a battery unit by using a battery module for electrical aircraft, wherein the electrical aircraft may include electric vertical takeoff and landing aircraft. The battery module may include a battery cell and a cooling plate for stabilizing battery temperature. The battery module may include a battery cell. The battery module may include a cooling plate configured to stabilize battery cell temperature. The cooling plate may include a cooling pipe configured to facilitate a flow of fluid through the battery cells. The fluid may include a gas. This may be implemented as disclosed with reference to FIGS. 1-7.

With continued reference to FIG. 8, method 800 includes a step 810 of placing a firewall to intercept ejecta debris from the battery cell. The firewall may include an ablative layer. This may be implemented as disclosed with reference to FIGS. 1-7.

With continued reference to FIG. 8, method 800 includes a step 815 of configuring an airgap to contain the ejecta debris between the firewall and the battery cell. This may be implemented as disclosed with reference to FIGS. 1-7.

With continued reference to FIG. 8, method 800 includes a step 820 of configuring a headspace to tolerate the ejecta debris on top of the battery cell. This may be implemented as disclosed with reference to FIGS. 1-7.

With continued reference to FIG. 8, method 800 includes a step 825 of placing an eject vent to vent the ejecta debris. The ejecta vent may be fluidically connected to a headspace. The ejecta vent may be further configured to vent the ejecta debris from the airgap through the headspace. The ejecta vent may include a duckbill valve. The ejecta vent may include a cooling fin. The ejecta vent may include an ejecta vent outlet, wherein the ejecta vent outlet may carry the ejecta debris out of the electric aircraft. This may be implemented as disclosed with reference to FIGS. 1-7.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A battery pack for an electric aircraft comprising:
 a battery module configured to house a battery unit, wherein the battery module comprises:
  a plurality of battery cells, wherein each of the plurality of battery cells has a cylindrical body and opposed first and second ends; and
  a cooling plate in thermal communication with the plurality of battery cells;
 a firewall configured to intercept ejecta debris from the plurality of battery cells, wherein the firewall is disposed proximal and substantially parallel to the first or second ends of the battery cells;
 an airgap extending between the firewall and the first or second ends of the battery cells;
 a wall of the battery pack positioned adjacent to the plurality of battery cells and perpendicular to the firewall, the wall defining a headspace in fluid communication with the airgap and an ejecta vent;
 wherein the airgap is configured to receive and contain a portion of the ejecta debris between the firewall and the battery cells during a thermal runaway event.

2. The battery pack of claim 1, wherein the electric aircraft comprises an electric vertical takeoff and landing (eVTOL) aircraft.

3. The battery pack of claim 1, wherein the cooling plate comprises a cooling pipe configured to facilitate a flow of fluid between the battery cells.

4. The battery pack of claim 3, wherein the fluid comprises a gas.

5. The battery pack of claim 1, wherein the ejecta vent is configured to vent the ejecta debris from the airgap through the headspace, wherein the airgap spaces a portion of the cylindrical body, facing the firewall, of the battery cell from the firewall by a width that is determined as a function of at least one battery cell parameter.

6. The battery pack of claim 1, wherein the ejecta vent comprises a cooling fin.

7. The battery pack of claim 1, wherein the ejecta vent comprises an ejecta vent outlet, wherein the ejecta vent outlet is configured to carry the ejecta debris out of the electric aircraft.

8. A method of manufacturing a battery pack for an electric aircraft comprising:
 housing, using a battery module, a battery unit, wherein the battery module comprises:
  a plurality of battery cells, wherein each of the plurality of battery cells has a cylindrical body and opposed first and second ends; and a cooling plate, in thermal communication with the plurality of battery cells;

placing a firewall to intercept ejecta debris from the plurality of battery cells, wherein the firewall is disposed proximal and substantially parallel to the first or second ends of the battery cells;

configuring an airgap to extend between the firewall and the first and the second ends of the battery cells;

configuring a wall of the battery pack positioned adjacent to the plurality of battery cells and perpendicular to the firewall, the wall defining a headspace in fluid communication with the airgap and an ejecta vent, wherein the airgap is configured to receive and contain a portion of the ejecta debris between the firewall and the battery cells during a thermal runaway event.

9. The method of claim 8, wherein the electric aircraft comprises an electric vertical takeoff and landing (eVTOL) aircraft.

10. The method of claim 8, wherein the cooling plate comprises a cooling pipe, the method further comprising:
facilitating, by the cooling pipe, a flow of fluid between the battery cells.

11. The method of claim 10, wherein the fluid comprises a gas.

12. The method of claim 8, further comprising:
venting, by the ejecta vent, the ejecta debris from the airgap through the headspace, wherein the airgap spaces a portion of the cylindrical body, facing the firewall, of the battery cell from the firewall by a width that is determined as a function of at least one battery cell parameter.

13. The method of claim 8, wherein the ejecta vent comprises a cooling fin.

14. The method of claim 8, wherein the ejecta vent comprises an ejecta vent outlet, the method further comprising:
carrying, by the ejecta vent outlet, the ejecta debris out of the electric aircraft.

15. The battery pack of claim 1, in combination with an electric vertical takeoff and landing aircraft, wherein the battery pack is disposed in a fuselage of the electric vertical takeoff and landing aircraft, and wherein the ejecta vent includes a vent outlet located on an aft portion of the fuselage and configured to expel the battery ejecta from the electric vertical takeoff and landing aircraft.

16. The battery pack of claim 1, wherein a volume of the airgap is designed and configured to be proportional to a number of battery cells and a corresponding expected amount of the ejecta debris.

17. The method of claim 8, wherein a volume between the firewall and the first or second ends of the battery cells is proportional to a number of battery cells and a corresponding expected amount of the ejecta debris.

* * * * *

UNITED STATES PATENT AND TRADEMARK OFFICE
CERTIFICATE OF CORRECTION

PATENT NO. : 11,967,693 B1
APPLICATION NO. : 17/966798
DATED : April 23, 2024
INVENTOR(S) : Sam Wagner and Nathan Goldsberry It is certified that error appears in the above-identified patent and that said Letters Patent is hereby corrected as shown below:

In the Specification

Column 20, Line 27 reads:
"...16/048,140 both entitled "SYSTEM AND METHOD FOR..."" but it should read "...16/948,140 both entitled "SYSTEM AND METHOD FOR...""

Column 21, Line 31 reads:
"...patent application Ser. No. 17/177,594 entitled "SYSTEM..."" but it should read "...patent application Ser. No. 17/137,594 entitled "SYSTEM...""

Signed and Sealed this
Eleventh Day of June, 2024

Katherine Kelly Vidal
*Director of the United States Patent and Trademark Office*